US008744834B2

(12) United States Patent
Macherey et al.

(10) Patent No.: US 8,744,834 B2
(45) Date of Patent: Jun. 3, 2014

(54) OPTIMIZING PARAMETERS FOR MACHINE TRANSLATION

(75) Inventors: Wolfgang Macherey, Mountain View, CA (US); Franz Josef Och, Palo Alto, CA (US); Shankar Kumar, Mountain View, CA (US); Roy W. Tromble, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 1266 days.

(21) Appl. No.: 12/497,184

(22) Filed: Jul. 2, 2009

(65) Prior Publication Data

US 2010/0004920 A1 Jan. 7, 2010

Related U.S. Application Data

(60) Provisional application No. 61/078,262, filed on Jul. 3, 2008.

(51) Int. Cl.
*G10L 17/20* (2013.01)

(52) U.S. Cl.
USPC .................................................. 704/4; 704/8

(58) Field of Classification Search
USPC .................................................. 704/2, 4, 7, 8
See application file for complete search history.

(56) References Cited

U.S. PATENT DOCUMENTS

| 5,748,850 | A | 5/1998 | Sakurai | |
|---|---|---|---|---|
| 7,856,351 | B2 | 12/2010 | Yaman et al. | |
| 7,957,971 | B2 | 6/2011 | Gorin et al. | |
| 2003/0110023 | A1* | 6/2003 | Bangalore et al. | 704/5 |
| 2007/0150257 | A1 | 6/2007 | Cancedda et al. | |
| 2007/0239432 | A1 | 10/2007 | Soong et al. | |
| 2007/0282590 | A1 | 12/2007 | Suzuki et al. | |
| 2009/0248416 | A1 | 10/2009 | Gorin et al. | |
| 2010/0004919 | A1 | 1/2010 | Macherey et al. | |
| 2010/0004920 | A1 | 1/2010 | Macherey et al. | |
| 2011/0202334 | A1* | 8/2011 | Abir | 704/4 |

FOREIGN PATENT DOCUMENTS

| JP | 2006053683 A | 2/2006 |
|---|---|---|
| JP | 2006099208 A | 4/2006 |

OTHER PUBLICATIONS

Papineni, K. et al., "Bleu: a Method for Automatic Evaluation of Machine Translation," IBM Research Report, RC22176 (W0109-022), IBM Research Division, Yorktown Heights, NY, Sep. 17, 2001.*
Dean, J., et al., *MapReduce: Simplified Data Processing on Large Clusters*, Proceedings of the 6th Symposium on Operating Systems Design and Implementation, Dec. 6, 2004, 13 pages.
International Search Report and Written Opinion for PCT Application No. PCT/US2009/049613, mailed Sep. 16, 2010, 10 pages.
Macherey, W., et al., "Lattice-based Minimum Error Rate Training for Statistical Machine Translation", In: Proceedings of the 2008 Conference on Empirical Methods in natural Language Processing, pp. 725-734.

(Continued)

*Primary Examiner* — Angela A Armstrong
(74) *Attorney, Agent, or Firm* — Remarck Law Group PLC

(57) ABSTRACT

Methods, systems, and apparatus, including computer program products, for language translation are disclosed. In one implementation, a method is provided. The method includes accessing a hypothesis space, where the hypothesis space represents a plurality of candidate translations; performing decoding on the hypothesis space to obtain a translation hypothesis that minimizes an expected error in classification calculated relative to an evidence space; and providing the obtained translation hypothesis for use by a user as a suggested translation in a target translation.

6 Claims, 7 Drawing Sheets

(56) References Cited

OTHER PUBLICATIONS

Tromble, R., et al., "Lattice Minimum Bayes-Risk Decoding for Statistical Machine Translation", In: Proceedings of the 2007 Conference on Empirical Methods in Natural Language Processing, Oct. 25-27, 2008, 10 pages.

Papineni, K., et al., "Bleu: a Method for Automatic Evaluation of Machine Translation," IBM Research Report, RC22176 (W0109-022), IBM Research Division, Yorktown Heights, NY, Sep. 17, 2001.

Zhang, H. et al., "Efficient Multi-pass Decoding for Synchronous Context Free Grammars," Proceedings of ACL-08: HLT, Columbus, Ohio, Jun. 2008, pp. 209-217.

Ehling, N. et al., "Minimum Bayes Risk Decoding for BLEU," In Proc. 45th Annual Meeting of the ACL Poster Session, U.S.A., Association for Computational Linguistics, Jun. 27, 2007, pp. 101 to 104, URL, http://aclweb.org/anthology-new/P/P07/P07-2026.pdf (7 pages).

Kumar, S. et al., "Minimum Bayes-Risk Decoding for Statistical Machine Translation," in Proceedings of HLT-NAACL, U.S.A., Apr. 5, 2004, pp. 169 to 176, URL, http://acl.ldc.upenn.edu/hlt-naacl2004/main/pdf/60_Paper.pdf (12 pages).

Blackwood, G. et al., "European Language Translation with Weighted Finite State Transducers: The CUED MT System for the 2008 ACL Workshop on SMT," Proceedings of the Third Workshop on Statistical Machine Translation, Columbus, Ohio, Jun. 2008, pp. 131-134.

Dyer, C. et al., "Generalizing Word Lattice Translation," Proceedings of ACL-08: HLT, Columbus, Ohio, Jun. 2008, pp. 1012-1020.

Och, F. et al., "Minimum Error Rate Training in Statistical Machine Translation, Proceedings of the 41st Annual Meeting of the Association for Computational Linguistics," Jul. 2003, pp. 160-167.

Supplemental European Search Report dated Oct. 2, 2013 for EP Application No. 09774566.5 (3 pages).

Ueffing, N. et al., "Generation of Word Graphs in Statistical Machine Translation," Proceedings of the Conference on Empirical Methods in Natural Language Processing (EMNLP), Philadelphia, PA, Jul. 2002, pp. 156-163.

* cited by examiner

OPTIMIZING PARAMETERS FOR MACHINE TRANSLATION

CROSS-REFERENCE TO RELATED APPLICATIONS

This application claims the benefit under 35 U.S.C. §119 (e) of U.S. Provisional Patent Application No. 61/078,262, entitled "Statistical Machine Translation", which was filed on Jul. 3, 2008. The disclosure of the above application is incorporated herein by reference in its entirety.

BACKGROUND

This specification relates to statistical machine translation.

Manual translation of text by a human operator can be time consuming and costly. One goal of machine translation is to automatically translate text in a source language to corresponding text in a target language. There are several different approaches to machine translation including example-based machine translation and statistical machine translation. Statistical machine translation attempts to identify a most probable translation in a target language given a particular input in a source language. For example, when translating a sentence from French to English, statistical machine translation identifies the most probable English sentence given the French sentence. This maximum likelihood translation can be expressed as:

$$\operatorname*{argmax}_{e} P(e \mid f),$$

which describes the English sentence, e, out of all possible sentences, that provides the highest value for P(e|f) Additionally, Bayes Rule provides that:

$$P(e \mid f) = \frac{P(e)P(f \mid e)}{P(f)}.$$

Using Bayes Rule, this most likely sentence can be re-written as:

$$\operatorname*{argmax}_{e} P(e \mid f) = \operatorname*{argmax}_{e} P(e) P(f \mid e).$$

Consequently, the most likely e (i.e., the most likely English translation) is one that maximizes the product of the probability that e occurs and the probability that e would be translated into f (i.e., the probability that a given English sentence would be translated into the French sentence).

Components that perform translation portions of a language translation task are frequently referred to as decoders. In certain instances, a first decoder (a first-pass decoder) can generate a list of possible translations, e.g., an N-best list. A second decoder (a second-pass decoder), e.g., a Minimum Bayes-Risk (MBR) decoder, can then be applied to the list to ideally identify which of the possible translations are the most accurate, as measured by minimizing a loss function that is part of the identification. Typically, an N-best list contains between 100 and 10,000 candidate translations, or hypotheses. Increasing the number of candidate translations improves the translation performance of an MBR decoder.

SUMMARY

This specification describes technologies relating to language translation.

In general, one aspect of the subject matter described in this specification can be embodied in methods that include the actions of accessing a translation lattice, where the translation lattice represents a plurality of candidate translations; performing decoding on the translation lattice to obtain a translation hypothesis that minimizes an expected error in classification in the translation lattice; and providing the obtained translation hypothesis for use by a user as a suggested translation in a target translation. Other embodiments of this aspect include corresponding systems, apparatus, and computer program products.

These and other embodiments can optionally include one or more of the following features. The method further includes generating the translation lattice including providing a source sample in a source language to a decoder. Performing MBR decoding includes calculating an approximation of a corpus BLEU gain. The approximation of the corpus BLEU gain is represented as:

$$G(E, E') = \theta_0 |E'| + \sum_{w \in N} \theta_w \cdot \#_w(E') \cdot \delta_w(E),$$

where w is a word, $\theta_w$ is a constant, E is a candidate translation, E' is an automatic translation, $\#_w(E')$ is a number of times that w occurs in E', and $\delta_w(E)$ is 1 if w∈E and 0 otherwise.

Performing decoding on the lattice includes performing Minimum Bayes-Risk (MBR) decoding. Performing MBR decoding includes calculating:

$$\hat{E} = \operatorname*{argmax}_{E' \in \Psi} \left\{ \theta_0 |E'| + \sum_{w \in N} \theta_w \cdot \#_w(E') \cdot P(w \mid \Psi) \right\},$$

where w is a word, $\theta_w$ is a constant, E' is an automatic translation, $\#_w(E')$ is a number of times that w occurs in E', $\Psi$ represents the translation lattice, and $P(w|\Psi)$ is the posterior probability of w in the translation lattice.

$$P(w \mid \Psi) = \sum_{E \in \Psi_w} P(E \mid F) = \frac{Z(\Psi_w)}{Z(\Psi)},$$

where $\Psi_w = \{E \in \Psi | \delta_w(E) > 0\}$ represents paths of the translation lattice containing w at least once, $Z(\Psi_w)$ represents a sum of weights of paths in $\Psi_w$, and $Z(\Psi)$ represents a sum of weights of paths in $\Psi$.

In general, another aspect of the subject matter described in this specification can be embodied in methods that include the actions of accessing a hypothesis space, where the hypothesis space represents a plurality of candidate translations; performing decoding on the hypothesis space to obtain a translation hypothesis that minimizes an expected error in classification calculated relative to an evidence space; and providing the obtained translation hypothesis for use by a user as a suggested translation in a target translation. Other embodiments of this aspect include corresponding systems, apparatus, and computer program products.

These and other embodiments can optionally include one or more of the following features. The hypothesis space is represented as a lattice. The evidence space is represented as an N-best list.

Particular embodiments of the subject matter described in this specification can be implemented to realize one or more of the following advantages. MBR decoding of a lattice increases sizes of hypothesis and evidence spaces, thereby increasing a number of candidate translations available and the likelihood of obtaining an accurate translation. In addition, MBR decoding provides a better approximation of a corpus BLEU score (as described in further detail below), thereby further improving translation performance. Furthermore, MBR decoding of a lattice is runtime efficient, thereby increasing the flexibility of statistical machine translation since the decoding can be performed at runtime.

Lattice-based Minimum Error Rate Training (MERT) provides exact error surfaces for all translations in a translation lattice, thereby further improving translation performance of a statistical machine translation system. The systems and techniques for lattice-based MERT are also space and runtime efficient, thereby reducing an amount of memory used, e.g., limiting memory requirements to be linearly related (at most) with the size of the lattice, and increasing a speed of translation performance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Statistical Translation Overview

Figure 1:
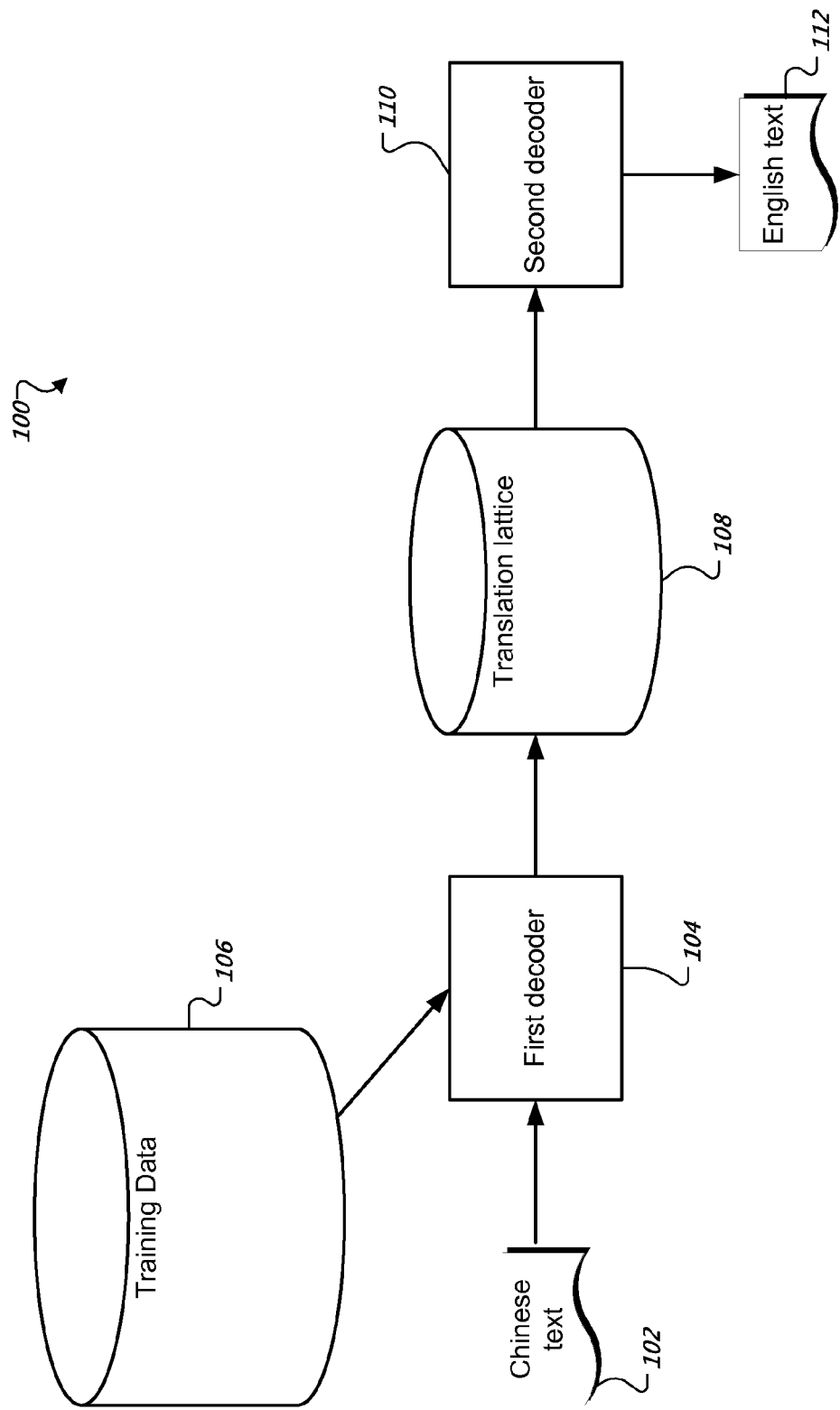
FIG. 1 is a conceptual diagram of an example process for translating input text from a source language to a target language.

Machine translation seeks to take input text in one language and accurately convert it into text in another language. Generally, the accuracy of a translation is measured against the ways in which expert humans would translate the input. An automatic translation system can analyze prior translations performed by human experts to form a statistical model of translation from one language to another. No such model can be complete, however, because the meaning of words often depends on context. Consequently, a step-wise word-for-word transformation of words from one language to another may not provide acceptable results. For example, idioms such as "babe in the woods" or slang phrases, do not translate well in a literal word-for-word transformation.

Adequate language models can help provide such context for an automatic translation process. The models can, for example, provide indications regarding the frequency with which two words appear next to each other in normal usage, e.g., in training data, or that other groups of multiple words or elements (n-grams) appear in a language. An n-gram is a sequence of n consecutive tokens, e.g., words or characters. An n-gram has an order or size, which is the number of tokens in the n-gram. For example, a 1-gram (or unigram) includes one token; a 2-gram (or bi-gram) includes two tokens.

A given n-gram can be described according to different portions of the n-gram. An n-gram can be described as a context and a future token, (context, w), where the context has a length n−1 and w represents the future token. For example, the 3-gram "$c_1c_2c_3$" can be described in terms of an n-gram context and a future token, where $c_1$, $c_2$, and $c_3$ each represent a character. The n-gram left context includes all tokens of the n-gram preceding the last token of the n-gram. In the given example, "$c_1c_2$" is the context. The left most token in the context is referred to as the left token. The future token is the last token of the n-gram, which in the example is "$c_3$". The n-gram can also be described with respect to a right context. The right context includes all tokens of the n-gram following the first token of the n-gram, represented as a (n−1)-gram. In the example above, "$c_2c_3$" is the right context.

Each n-gram can have an associated probability estimate, e.g., a log-probability, that is calculated as a function of a count of occurrences in training data relative to a count of total occurrences in the training data. In some implementations, the probabilities of n-grams being a translation of input text is trained using the relative frequency of the n-grams represented in a target language as a reference translation of corresponding text in a source language in training data, e.g., training data including a set of text in the source language and corresponding text in the target language.

Additionally, in some implementations, a distributed training environment is used for large training data (e.g., terabytes of data). One example technique for distributed training is MapReduce. Details of MapReduce are described in J. Dean and S. Ghemawat, *MapReduce: Simplified Data Processing on Large Clusters*, Proceedings of the 6th Symposium on Operating Systems Design and Implementation, pp. 137-150 (Dec. 6, 2004).

Past usage represented by a training set can be used to predict how samples in one language should be translated to a target language. In particular, the n-grams, associated probability estimates, and respective counts can be stored in a language model for use by a decoder, e.g., a Bayesian decoder to identify translations for input text. A score indicating the likelihood that input text can be translated to corresponding text in a target language can be calculated by mapping the n-grams included in the input text to associated probability estimates for a particular translation.

Example Translation Process

FIG. 1 is a conceptual diagram of an example process 100 for translating input text from a source language to a target language. A source sample 102 is shown as a passage of Chinese text, and is provided to a first decoder 104. The decoder 104 can take a variety of forms and can be used in an attempt to maximize a posterior probability for the passage, given a training set of documents 106 that has been provided to the decoder 104 during a training phase for the decoder 104. In translating the sample 102, the decoder 104 can select n-grams from within the document and attempt to translate the n-grams. The decoder 104 can be provided with a re-ordering model, alignment model, and language model, among other possible models. The models direct the decoder 104 in selecting n-grams from within the sample 102 for translation. As one simple example, the model can use delimiters, e.g., punctuation such as a comma or period, to identify the end of an n-gram that may represent a word.

The decoder 104 can produce a variety of outputs, e.g., data structures that include possible translations. For example, the decoder 104 can produce an N-best list of translations. In some implementations, the decoder 104 generates a translation lattice 108, as described in further detail below.

A second decoder 110 then processes the translation lattice 108. While the first decoder 104 is generally aimed at maximizing the posterior probability of the translation, i.e., matching the input to what the historical collection of documents 106 may indicate to be a best match to past expert manual translations of other passages, the second decoder 110 is aimed at maximizing a quality measure for the translation. As such, the second decoder 110 may re-rank the candidate translations that reside in the translation lattice so as to produce a "best" translation that may be displayed to a user of the system 100. This translation is represented by the English sample 112 corresponding to the translation of the Chinese sample 102.

The second decoder 110 can use a process known as MBR decoding, which seeks the hypothesis (or candidate translation) that minimizes the expected error in classification. The process thus directly incorporates a loss function into the decision criterion for making a translation selection.

Minimum Bayes Risk Decoding

Minimum Bayes-Risk (MBR) decoding aims to find a translation hypothesis, e.g., a candidate translation, that has the least expected error under the probability model. Statistical machine translation can be described as mapping of input text F in a source language to translated text E in a target language. A decoder $\delta(F)$, e.g., decoder 104, can perform the mapping. If the reference translation E is known, the decoder performance can be measured by the loss function $L(E, \delta(F))$. Given such a loss function $L(E, E')$ between an automatic translation E' and the reference translation E, and an underlying probability model $P(E, F)$, the MBR decoder, e.g., the second decoder 110, can be represented by:

$$\hat{E} = \operatorname*{argmin}_{E' \in \Psi} R(E') = \operatorname*{argmin}_{E' \in \Psi} \sum_{E' \in \Psi} L(E, E') P(E \mid F),$$

where R(E) represents the Bayes risk of candidate translation E' under the loss function L, and $\Psi$ represents the space of translations. For N-best MBR, the space $\Psi$ is an N-best list produced, for example, by the first decoder 104. When a translation lattice is used, $\Psi$ represents candidate translations encoded in the translation lattice.

If the loss function between any two hypotheses can be bounded, i.e., $L(E, E') \le L_{max}$, the MBR decoder can be written in terms of a gain function, $G(E, E') = L_{max} - L(E, E')$, as:

$$\hat{E} = \operatorname*{argmax}_{E' \in \Psi} \sum_{E' \in \Psi} G(E, E') P(E \mid F). \quad \text{(Eq. 1)}$$

In some implementations, MBR decoding uses different spaces for hypothesis selection and risk computation. For example, the hypothesis can be selected from an N-best list and the risk can be computed based on a translation lattice. In the example, the MBR decoder can be rewritten as:

$$\hat{E} = \operatorname*{argmax}_{E' \in \Psi_h} \sum_{E' \in \Psi_e} G(E, E') P(E \mid F),$$

where $\Psi_h$ represents the hypothesis space and $\Psi_e$ represents an evidence space used for computing Bayes risk.

MBR decoding can be improved by using larger spaces, i.e., hypothesis and risk computation spaces. Lattices can include more candidate translations than an N-best list. For example, lattices can include more than one billion candidate translations. As such, representing the hypothesis and risk computation spaces using lattices increases the accuracy of MBR decoding, thereby increasing the likelihood that an accurate translation is provided.

Example Translation Lattice and MBR Decoding

Figure 2A:
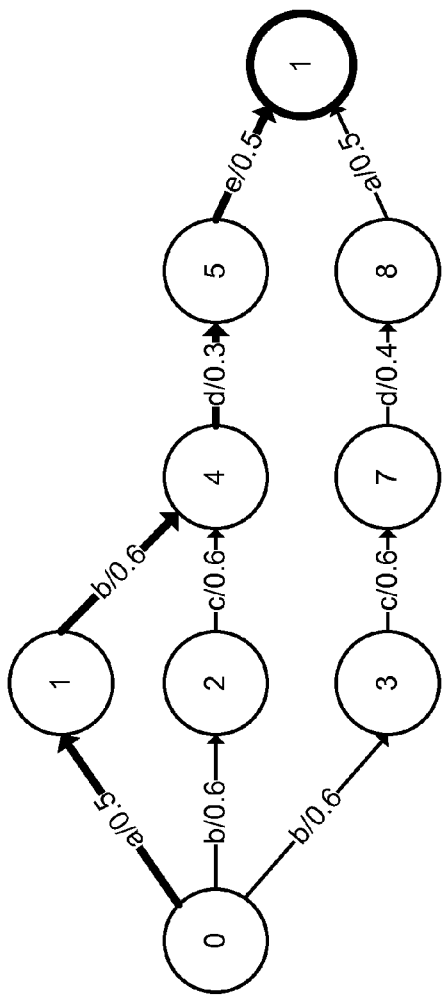
FIG. 2A illustrates an example translation lattice.

FIG. 2A illustrates an example translation lattice 200. In particular, translation lattice 200 is a translation n-gram lattice that can be considered to be a compact representation for very large N-best lists of translation hypotheses and their likelihoods. Specifically, the lattice is an acyclic weighted finite state acceptor including states (e.g., states 0 through 6) and arcs representing transitions between states. Each arc is associated with an n-gram (e.g., a word or phrase) and a weight. For example, in translation lattice 200, n-grams are represented by labels "a", "b", "c", "d", and "e". State 0 is connected to a first arc that provides a path to state 1, a second arc that provides a path to state 4 from state 1, and a third arc that provides a path to state 5 from state 4. The first arc is associated with "a" and weight 0.5, the second arc is associated with "b" and weight 0.6, and the third arc is also associated with "d" and weight 0.3.

Each path in the translation lattice 200, including consecutive transitions beginning at an initial state (e.g., state 0) and ending at a final state (e.g., state 6), expresses a candidate translation. Aggregation of the weights along a path produces a weight of the path's candidate translation H(E, F) according to the model. The weight of the path's candidate translation represents the posterior probability of the translation E given the source sentence F as:

$$P(E \mid F) = \frac{\exp(\alpha \cdot H(E, F))}{\sum_{E' \in \Psi} \exp(\alpha \cdot H(E', F))},$$

where $\alpha \in (0, \infty)$ is a scaling factor that flattens the distribution when $\alpha < 1$, and sharpens the distribution when $\alpha > 1$.

In some implementations, a gain function G is expressed as a sum of local gain functions $g_i$. A gain function can be considered to be a local gain function if it can be applied to all paths in the lattice using Weighted Finite State Transducers (WFSTs) composition, resulting in a o(N) increase in the number of states N in the lattice. The local gain functions can weight n-grams. For example, given a set of n-grams $N = \{w_1, \ldots, w_{|N|}\}$, a local gain function $g_w: \epsilon \times \epsilon \to \Re$, where $w \in N$, can be expressed as:

$$g_w(E \mid E') = \theta_w \cdot \#_w(E') \cdot \delta_w(E),$$

where $\theta_w$ is a constant, $\#_w(E')$ is a number of times that w occurs in E', and $\delta_w(E)$ is 1 if w∈E and 0 otherwise. Assuming that the overall gain function G(E, E') can be written as a sum of local gain functions and a constant $\theta_0$ times the length of the hypothesis E', the overall gain function can be expressed as:

$$G(E, E') = \theta_0|E'| + \sum_{w \in N} g_w(E|E') = \theta_0|E'| + \sum_{w \in N} \theta_w \cdot \#_w(E') \cdot \delta_w(E).$$

Using this overall gain function, the risk, i.e., $$\sum_{E' \in \Psi} G(E, E')P(E|F),$$

can be rewritten such that the MBR decoder for the lattice (in Equation 1) is expressed as:

$$\hat{E} = \underset{E' \in \Psi}{\operatorname{argmax}} \left\{ \theta_0|E'| + \sum_{w \in N} \theta_w \cdot \#_w(E') \cdot P(w|\Psi) \right\}, \quad \text{(Eq. 2)}$$

where $P(w|\Psi)$ is the posterior probability of the n-gram w in the lattice, or $\Sigma_{E \in \Psi_w} P(E|F)$, and can be expressed as:

$$P(w|\Psi) = \sum_{E \in \Psi_w} P(E|F) = \frac{Z(\Psi_w)}{Z(\Psi)}, \quad \text{(Eq. 3)}$$

where $\Psi_w = \{E \in \Psi | \delta_w(E) > 0\}$ represents the paths of the lattice containing the n-gram w at least once, and $Z(\Psi_w)$ and $Z(\Psi)$ represent the sum of weights of all paths in the lattices $\Psi_w$ and $\Psi$, respectively.

In some implementations, the MBR decoder (Equation 2) is implemented using WFSTs. A set of n-grams that are included in the lattice are extracted, e.g., by traversing the arcs in the lattice in topological order. Each state in the lattice has a corresponding set of n-gram prefixes. Each arc leaving a state extends each of the state's prefixes by a single word. N-grams that occur at a state followed by an arc in the lattice are included in the set. As an initialization step, an empty prefix can be initially added to each state's set.

For each n-gram w, an automaton (e.g., another lattice) matching paths containing the n-gram is generated, and the automaton is intersected with the lattice to find a set of paths containing the n-gram, i.e., $\Psi_w$. For example, if $\Psi$ represents the weighted lattice, $\Psi_w$ can be represented as:

$$\Psi_w = \Psi \cap (\Sigma^* w \Sigma^*).$$

The posterior probability $P(w|\Psi)$ of n-gram w can be calculated as a ratio of the total weights of paths in $\Psi_w$ to the total weights of paths in the original lattice $\Psi$, as given above in Equation 3.

The posterior probability for each n-gram w can be calculated as described above, and then multiplied by $\theta_w$ (an n-gram factor) as described with respect to Equation 2. An automaton that accepts an input with weight equal to a number of times the n-gram occurs in the input times $\theta_w$ is generated. The automaton can be represented using the weighted regular expression:

$$\overline{w}(w/(\theta_w P(w|\Psi))\overline{w})^*,$$

where $\overline{w} = \overline{(\Sigma^* w \Sigma^*)}$ is the language that includes all strings that do not contain the n-gram w.

Each generated automaton is successively intersected with second automatons that each begin as an un-weighted copy of the lattice. Each of these second automatons is generated by intersecting the un-weighted lattice with an automaton accepting $(\Sigma/\theta_0)^*$. The resulting automaton represents the total expected gain of each path. A path in the resulting automaton that represents a word sequence E' has a cost:

$$\theta_0|E'| + \sum_{w \in N} \theta_w \cdot \#_w(E') \cdot P(w|\Psi).$$

The path associated with the least cost, e.g., according to Equation 2, is extracted from the resulting automaton, producing the lattice MBR candidate translation.

In implementations where the hypothesis and evidence spaces lattices are different, the evidence space lattice is used for extracting the n-grams and computing associated posterior probabilities. The MBR automaton is constructed starting with an un-weighted copy of the hypothesis space lattice. Each of the n-gram automata is successively intersected with the un-weighted copy of the hypothesis space lattice.

An approximation to the BLEU score is used to calculate a decomposition of the overall gain function G(E, E') as a sum of local gain functions. A BLEU score is an indicator of translation quality of text which has been machine translated. Additional details of Bleu are described in K. Papineni, S. Roukes, T. Ward, and W. Zhu. 2001. *Bleu: a Method for Automatic Evaluation of Machine Translation*. Technical Report RC22176 (W109-022), IBM Research Division. In particular, the system calculates a first order Taylor-series approximation to the change in corpus BLEU score from including a sentence to not including the sentence in the corpus.

Given a reference length r of a corpus (e.g., a length of a reference sentence, or a sum of the lengths of multiple reference sentences), a candidate length $c_0$, and a number of n-gram matches $\{c_n | 1 \le n \le 4\}$, the corpus BLEU score $B(r, c_0, c_n)$ can be approximated as:

$$\log B = \min\left(0, 1 - \frac{r}{c_0}\right) + \frac{1}{4} \sum_{n=1}^{4} \log \frac{c_n}{c_0 - \Delta_n}$$

$$\approx \min\left(0, 1 - \frac{r}{c_0}\right) + \frac{1}{4} \sum_{n=1}^{4} \log \frac{c_n}{c_0},$$

where $\Delta_n$, the difference between a number of words in the candidate and the number of n-grams: $\Delta_n = n-1$, is assumed to be negligible.

The corpus log(BLEU) gain is defined as the change in log(BLEU) when a new sentence's (E') statistics is included in the corpus statistics, and expressed as:

$$G = \log B' - \log B,$$

where the counts in B' are those of B added to the counts for the current sentence. In some implementations, an assumption that $c \ge r$ is used, and only $c_n$ is treated as a variable. Therefore, the corpus log BLEU gain can be approximated by a first-order vector Taylor series expansion about the initial values of $c_n$ as:

$$G = \sum_{n=0}^{N}(c'_n - c_n)\frac{\partial \log B'}{\partial c_n}\bigg|_{c'_n=c_n},$$

where the partial derivatives are expressed as:

$$\frac{\partial \log B}{\partial c_0} = \frac{-1}{c_0}, \text{ and } \frac{\partial \log B}{\partial c_n} = \frac{1}{4c_n}.$$

Therefore, the corpus log(BLEU) gain can be rewritten as:

$$G = \Delta \log B \approx -\frac{\Delta c_0}{c_0} + \frac{1}{4}\sum_{n=1}^{4}\frac{\Delta c_n}{c_n},$$

where the $\Delta$ terms count various statistics in a sentence of interest, rather than the corpus as a whole. These approximations suggest that the values of $\theta_0$ and $\theta_w$ (e.g., in Equation 2) can be expressed as:

$$\theta_0 = \frac{-1}{c_0}, \text{ and } \theta_w = \frac{1}{4c_{|w|}}.$$

Assuming that the precision of each n-gram is a constant ratio r times the precision of a corresponding (n−1)-gram, the BLEU score can be accumulated at the sentence level. For example, if the average sentence length in a corpus is assumed to be 25 words, then:

$$\frac{\#(n)\text{gram\_tokens}}{\#(n-1)\text{gram\_tokens}} = 1 - \frac{1}{25} = 0.96.$$

If the unigram precision is p, the n-gram factors (n∈{1,2, 3,4}), as a function of the parameters p and r and the number of unigram tokens T, can be expressed as:

$$\theta_0 = \frac{-1}{T}, \text{ and } \theta_w = \frac{1}{Tp \cdot 4(0.96 \cdot r)^n}.$$

In some implementations, p and r are set to the average values of unigram precision and precision ratio across multiple training sets. Substituting the n-gram factors in Equation 2 provides that the MBR decoder, e.g., a MBR decision rule, does not depend on T and multiple values of T can be used.

Figure 2B:
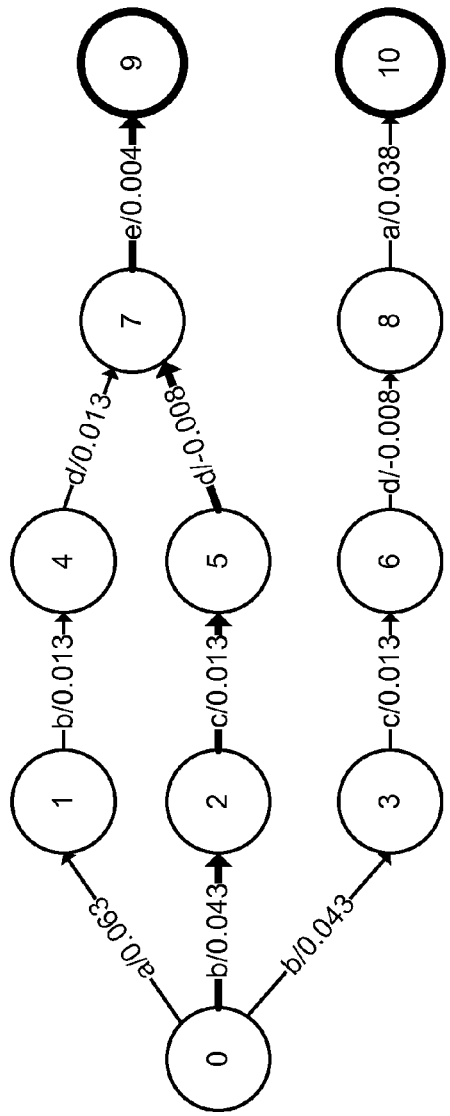
FIG. 2B illustrates an example MBR automaton for the translation lattice of FIG. 2A.

FIG. 2B illustrates an example MBR automaton for the translation lattice of FIG. 2A. The bold path in the translation lattice 200 in FIG. 2A is a Maximum A Posteriori (MAP) hypothesis, and the bold path in the MBR automaton 250 in FIG. 2B is an MBR hypothesis. In the example illustrated by FIGS. 2A and 2B, T=10, p=0.85, and r=0.75. Note that the MBR hypothesis (bcde) has a higher decoder cost relative to the MAP hypothesis (abde). However, bcde receives a higher expected gain than abde since it shares more n-grams with the third ranked hypothesis (bcda), illustrating how a lattice can help select MBR translations that are different from a MAP translation.

Minimum Error Rate Training (MERT) Overview

Minimum error rate training (MERT) measures an error metric of a decision rule for classification, e.g., MBR decision rule using a zero-one loss function. In particular, MERT estimates model parameters such that the decision under the zero-one loss function maximizes an end-to-end performance measure on a training corpus. In combination with log-linear models, the training procedure optimizes an unsmoothed error count. As previously stated, the translation that maximizes the a-posteriori probability can be selected based on $$\underset{e}{\arg\max} P(e \mid f).$$

Since the true posterior distribution is unknown, P(e|f) is approximated with a log-linear translation model, for example, which combines one or more feature functions $h_m(e,f)$ with feature function weights $\lambda_m$ where m=1, . . . , M. The log-linear translation model can be expressed as:

$$P(e \mid f) = P_{\lambda_1^M}(e \mid f) = \frac{\exp\left[\sum_{m=1}^{M}\lambda_m h_m(e, f)\right]}{\sum_{e'}\exp\left[\sum_{m=1}^{M}\lambda_m h_m(e', f)\right]}.$$

The feature function weights are the parameters of the model, and the MERT criterion finds a parameter set $\lambda_1^M$ that minimizes the error count on a representative set of training sentences using the decision rule, e.g., $$\underset{e}{\arg\max} P(e \mid f).$$

Given source sentences $f_1^S$ of a training corpus, reference translations $r_1^S$, and a set of K candidate translations $C_s = \{e_{s,1}, \ldots e_{s,K}\}$, the corpus-based error count for translations $e_1^S$ is additively decomposable into error counts of individual sentences, i.e., $$E(r_1^S, e_1^S) = \sum_{s=1}^{S} E(r_1, e_1).$$

The MERT criterion can be expressed as:

$$\lambda_1^M = \underset{\lambda_1^M}{\arg\min}\left\{\sum_{s=1}^{S} E(r_s, \hat{e}(f_s; \lambda_1^M))\right\} \quad \text{(Eq. 4)}$$

$$= \underset{\lambda_1^M}{\arg\min}\left\{\sum_{s=1}^{S}\sum_{k=1}^{K} E(r_s, r_{s,k})\delta(\hat{e}(f_s; \lambda_1^M), e_{s,k})\right\},$$

where $\hat{e}(f_s; \lambda_1^M) = \underset{e}{\arg\max}\left\{\sum_{m=1}^{M}\lambda_m h_m(e, f_s)\right\}.$ A line optimization technique can be used to train a linear model under the MERT criterion. The line optimization determines, for each feature function $h_m$ and sentence $f_s$, the exact error surface on a set of candidate translations $C_s$. The feature function weights are then adjusted by traversing the combined error surfaces of sentences in the training corpus and setting weights to a point where the resulting error is a minimum.

The most probable sentence hypothesis in $C_s$ along a line $\lambda_1^M + \gamma \cdot d_1^M$ can be defined as:

$$\hat{e}(f_s; \gamma) = \underset{e \in C_s}{\operatorname{argmax}} \{(\lambda_1^M + \gamma \cdot d_1^M)^T \cdot h_1^M(e, f_s)\}.$$

The total score for any candidate translation corresponds to a line in the plane with $\gamma$ as the independent variable. Overall, $C_s$ defines K lines where each line may be divided into at most K line segments due to possible intersections with other K−1 lines.

For each $\gamma$, the decoder (e.g., the second decoder 110) determines a respective candidate translation that yields the highest score and therefore corresponds to a topmost line segment. A sequence of topmost line segments constitute an upper envelope that is a point-wise maximum over all lines defined by $C_s$. The upper envelope is a convex hull and can be inscribed with a convex polygon whose edges are the segments of a piecewise linear function in $\gamma$. In some implementations, the upper envelope is calculated using a sweep line technique. Details of the sweep line technique are described, for example, in W. Macherey, F. Och, I. Thayer, and J. Uzskoreit, *Lattice-based Minimum Error Rate Training for Statistical Machine Translation*, Proceedings of the 2008 Conference on Empirical Methods in Natural Language Processing, pages 725-734, Honolulu, October 2008.

MERT on Lattices

A lattice (e.g., a phrase lattice) for a source sentence f can be defined as a connected, directed acyclic graph $\mathcal{G}_f = (v_f, \epsilon_f)$ with vertices set $v_f$, unique source and sink nodes s,t$\in v_f$ and a set of arcs; $\bar{\epsilon}_f \subset v_f \times v_f$. Each arc is labeled with a phrase $\phi_{ij} = e_i, \ldots, e_j$, and the (local) feature function values $h_1^M(\phi_{ij}, f)$ of this phrase. A path $\pi = (v_0, \epsilon_0, v_1, \epsilon_1, \ldots, \epsilon_{n-1}, v_n)$ in $G_f$ (with $\epsilon_i \in \epsilon_f$ and $v_i, v_{i+1} \in v_f$ as the tail and head of $\epsilon_i$, $0 \leq i < n$) defines a partial translation e (of f), which is the concatenation of all phrases along this path. Related feature function values are obtained by summing over the arc-specific feature function values:

$$\pi: \bullet \xrightarrow[h_1^M(\varphi_{0,1}, f)]{\varphi_{0,1}} v_1 \xrightarrow[h_1^M(\varphi_{1,2}, f)]{\varphi_{1,2}} \cdots \xrightarrow[h_1^M(\varphi_{n-1,n}, f)]{\varphi_{n-1,n}} \bullet v_n$$

$$e_\pi = \underset{i,j: v_i \to v_j \in \pi}{\bigcirc} \varphi_{ij} = \varphi_{0,1} \circ \cdots \circ \varphi_{n-1,n}$$

$$h_1^M(e_\pi, f) = \sum_{i,j: v_i \to v_j \in \pi} h_1^M(\varphi_{ij}, f)$$

In the following discussion, the notation enter(v) and leave (v) refer to the set of incoming and outgoing arcs, respectively, for a node $v \in v_f$. Similarly, head($\epsilon$) and tail($\epsilon$) denote the head and tail of arc $\epsilon$, respectively.

Figure 3:
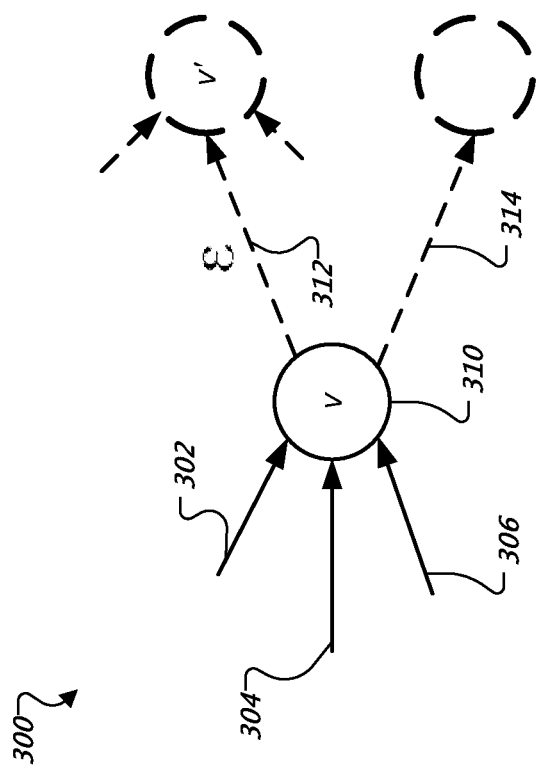
FIG. 3 illustrates a portion of an example translation lattice.

FIG. 3 illustrates a portion of an example translation lattice 300. In FIG. 3, incoming arcs 302, 304, and 306 enter node v 310. In addition, outgoing arcs 312 and 314 exit node v 310.

Each path that starts at a source node s and ends in v (e.g., node v 310) defines a partial translation hypothesis that can be represented as a line (cf. Equation 4). Assume that the upper envelope for these partial translation hypotheses is known, and the lines that define the envelope are denoted by $f_1, \ldots, f_N$. Outgoing arcs $\epsilon$ that are elements of the set leave(v), e.g., arc 312, represent continuations of these partial candidate translations. Each outgoing arc defines another line denoted by g($\epsilon$). Adding the parameters of g($\epsilon$) to all lines in the set $f_1, \ldots, f_N$ produces an upper envelope defined by $f_1 + g(\epsilon), \ldots, f_N + g(\epsilon)$.

Because the addition of g($\epsilon$) does not change the number of line segments or their relative order in the envelope, the structure of the convex hull is preserved. Therefore, the resulting upper envelope can be propagated over an outgoing arc $\epsilon$ to a successor node v'=head($\epsilon$). Other incoming arcs for v' may be associated with different upper envelopes. The upper envelopes are merged into a single, combined envelope, which is the convex hull of the union over the line sets which constitute the individual envelopes. By combining upper envelopes for each incoming arc v', the upper envelope for all partial candidate translations that are associated with paths starting at the source node s and ending in v' is generated.

Other implementations are possible. In particular, additional refinements can be performed to improve the performance of MERT (for lattices). For example, in order to prevent the line optimization technique from stopping in a poor local optimum, MERT can explore additional starting points that are randomly chosen by sampling the parameter space. As another example, the range of some or all feature function weights can be limited by defining weight restrictions. In particular, a weight restriction for a feature function $h_m$ can be specified as an interval $\mathcal{R}_m = [l_m, r_m]$, $l_m, r_m \in \mathbb{R} \cup \{-\infty, +\infty\}$, which defines an admissible region from which the feature function weight $\lambda_m$ can be selected. If the line optimization is performed under weights restrictions, $\gamma$ is selected such that: $l_1^M \leq \lambda_1^M + \gamma \cdot d_1^M \leq r_1^M$.

In some implementations, weights priors can be used. Weights priors provide a small (positive or negative) boost $\omega$ on the objective function if the new weight is chosen as to match a certain target value $\lambda_m^*$:

$$\gamma_{opt} = \underset{\gamma}{\operatorname{argmin}} \left\{ \sum_s E(r_s, \hat{e}(f_s; \gamma)) + \sum_m \delta(\lambda_m + \gamma \cdot d_m, \lambda_m^*) \cdot \omega \right\}$$

A zero weights prior $\lambda_m^* = 0$ allows feature selection because the weights of feature functions, which are not discriminative, are set to zero. For example, an initial weights prior $\lambda_m^* = \lambda_m$ can be used to limit changes in parameters, such that an updated parameter set has fewer differences relative to an initial weights set.

In some implementations, an interval $[\gamma_i^{f_s}, \gamma_i^{f_s} + 1)$ of a translation hypothesis, which has a change in error count $\Delta E_i^{f_s}$ that is equal to zero, is merged with an interval $[\gamma_{i-1}^{f_s}, \gamma_i^{f_s})$ of its left-adjacent translation hypothesis. The resulting interval $[\gamma_{i-1}^{f_s}, \gamma_{i+1}^{f_s})$ has a larger range, and the reliability of a selection of the optimum value of $\lambda$ can be increased.

In some implementations, the system uses random directions to update multiple feature functions simultaneously. If the directions used in line optimization are the coordinate axes of the M-dimensional parameter space, each iteration results in an update of a single feature function. While this update technique provides a ranking of the feature functions according to their discriminative power, e.g., each iteration selects a feature function for which changing the corresponding weight yields the highest gain, the update technique does not account for possible correlations between the feature functions. As a result, optimization may stop in a poor local optimum. The use of random directions allows multiple feature functions to be updated simultaneously. The use of random directions can be implemented by selecting lines which connect one or more random points on the surface of an M-dimensional hyper sphere with the hyper sphere's center (defined by the initial parameter set).

Figure 4:
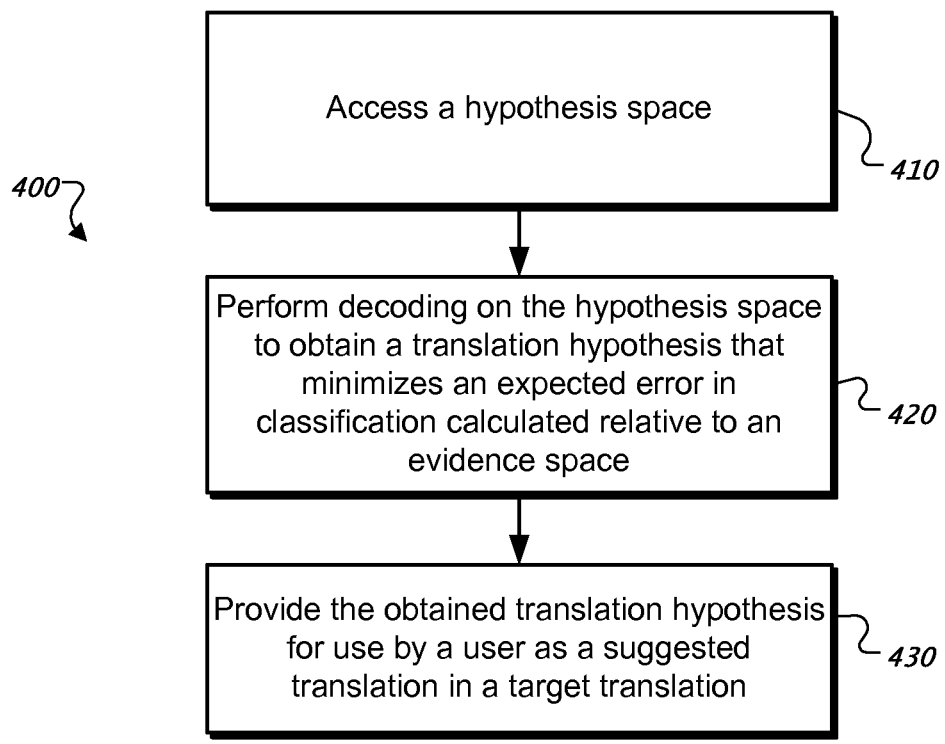
FIG. 4 shows an example process for MBR decoding.

FIG. 4 shows an example process 400 for MBR decoding. For convenience, MBR decoding will be described with respect to a system that performs the decoding. The system accesses 410 a hypothesis space. The hypothesis space represents a plurality of candidate translations, e.g., in a target language of corresponding input text in a source language. For example, a decoder (e.g., second decoder 110 in FIG. 1) can access a translation lattice (e.g., translation lattice 108). The system performs 420 decoding on the hypothesis space to obtain a translation hypothesis that minimizes an expected error in classification calculated relative to an evidence space. For example, the decoder can perform the decoding. The system provides 430 the obtained translation hypothesis for use by a user as a suggested translation in a target translation. For example, the decoder can provide a translation text (e.g., English sample 112) for use by a user.

Figure 5A:
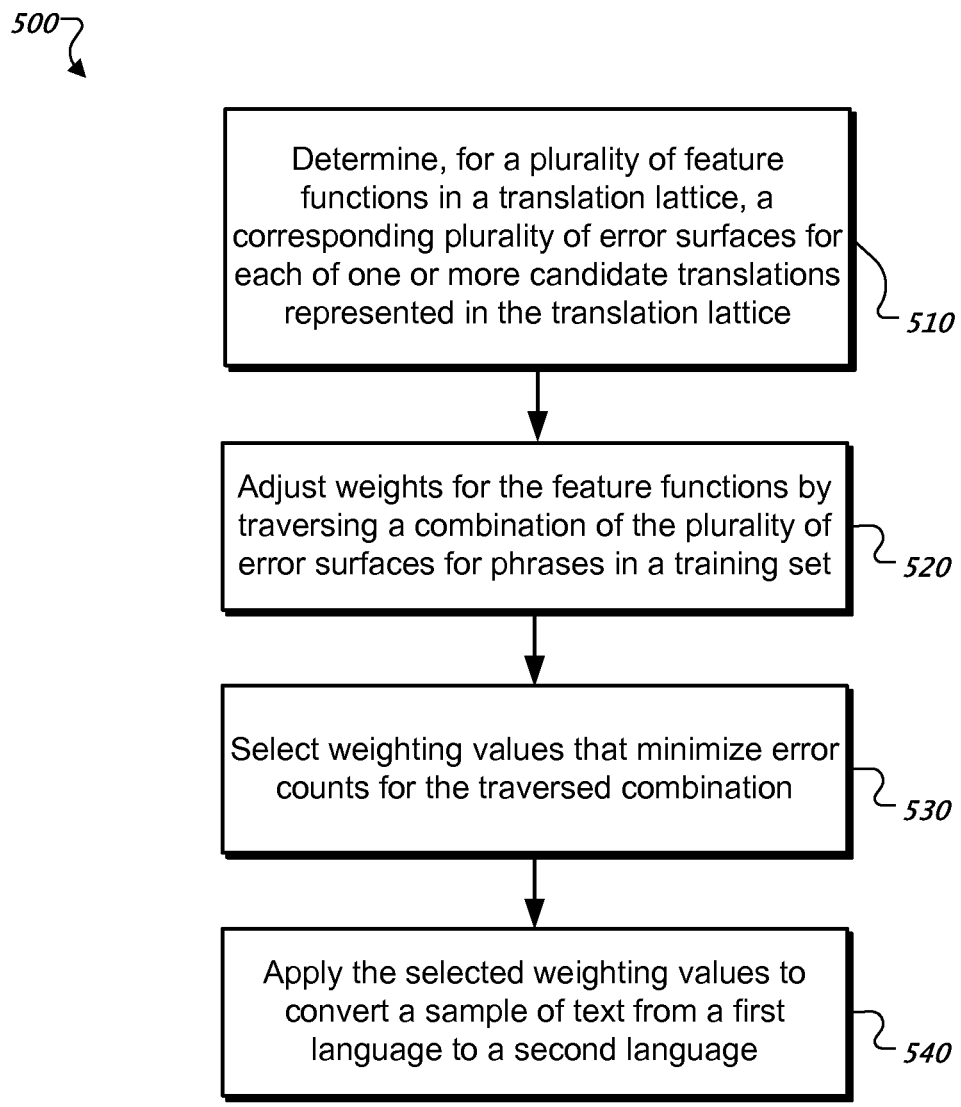
FIG. 5A shows an example process for Minimum Error Rate Training (MERT) on a lattice.
Figure 5B:
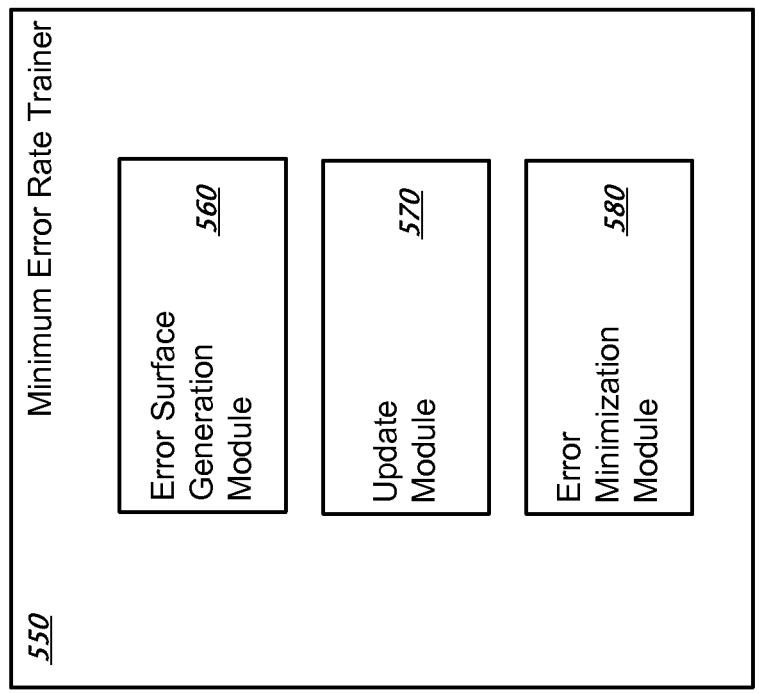
FIG. 5B illustrates an example Minimum Error Rate Trainer.

FIG. 5A shows an example process 500 for MERT on a lattice. For convenience, performing MERT will be described with respect to a system that performs the training. The system determines 510, for a plurality of feature functions in a translation lattice, a corresponding plurality of error surfaces for each of one or more candidate translations represented in the translation lattice. For example, error surface generation module 560 of Minimum Error Rate Trainer 550 in FIG. 5B can determine the corresponding plurality of error surfaces. The system adjusts 520 weights for the feature functions by traversing a combination of the plurality of error surfaces for phrases in a training set. For example, update module 570 of Minimum Error Rate Trainer 550 can adjust the weights. The system selects 530 weighting values that minimize error counts for the traversed combination. For example, error minimization module 580 of Minimum Error Rate Trainer 550 can select weighting values. The system applies 540 the selected weighting values to convert a sample of text from a first language to a second language. For example, Minimum Error Rate Trainer 550 can apply the selected weighting values to a decoder.

Figure 6:
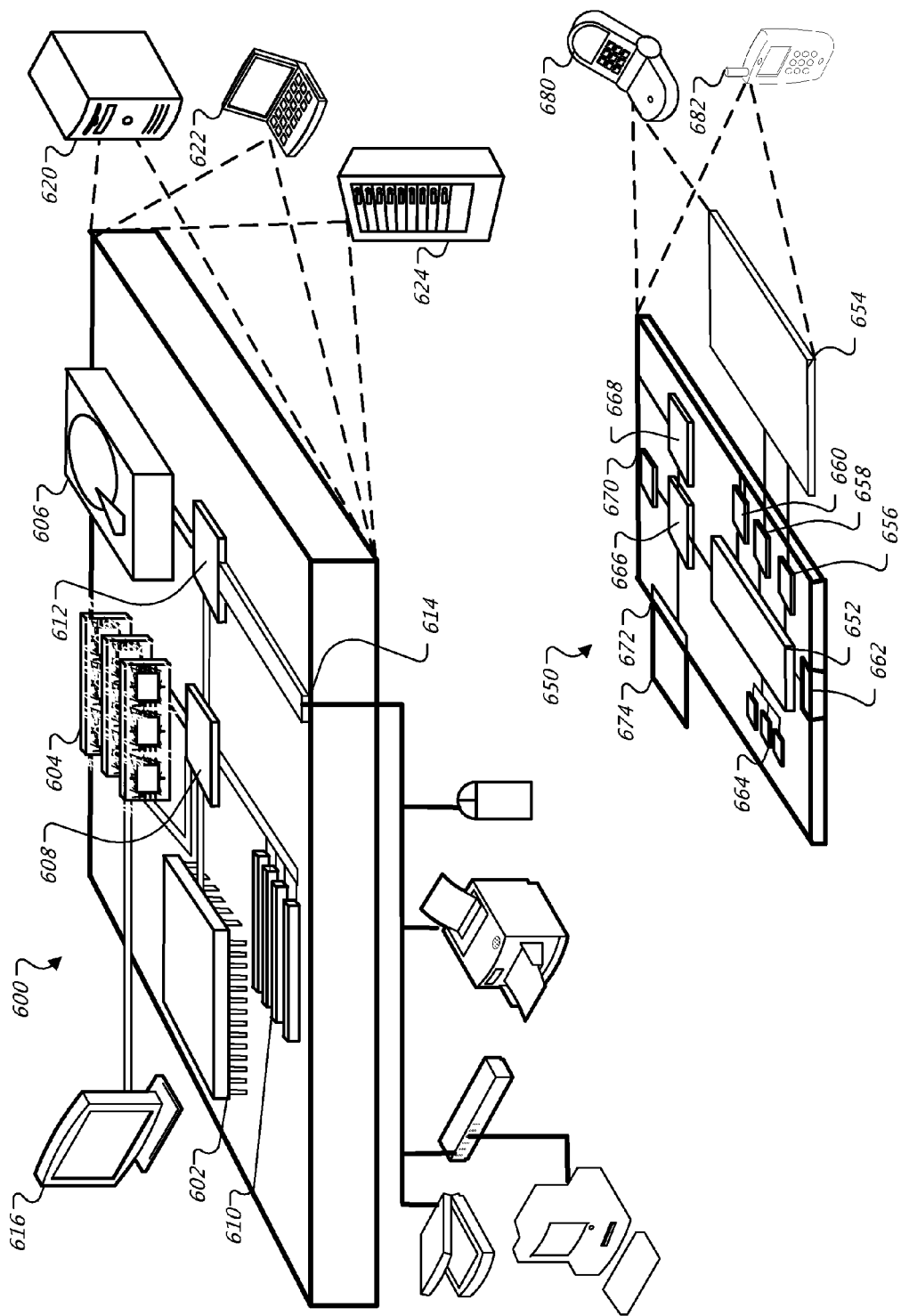
FIG. 6 shows an example of a generic computer device and a generic mobile computer device.

FIG. 6 shows an example of a generic computer device 600 and a generic mobile computer device 650, which may be used with the techniques (e.g., processes 400 and 500) described. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the systems and techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
accessing, by one or more computing devices having one or more processors, a translation lattice, where the translation lattice represents a plurality of candidate translations generated by a single first machine translation system;
performing decoding, by the one or more computing devices, on the translation lattice utilizing a second machine translation system to obtain a translation hypothesis from the plurality of candidate translations that minimizes an expected error in classification in the translation lattice, the second machine translation system being different from the first machine translation system; and
providing, from the one or more computing devices, the obtained translation hypothesis for use by a user as a suggested translation in a target translation,
where performing decoding on the lattice comprises performing Minimum Bayes-Risk (MBR) decoding that includes calculating an approximation of a corpus BLEU gain,
where the approximation of the corpus BLEU gain is represented as:

$$G(E, E') = \theta_0 |E'| + \sum_{w \in N} \theta_w \cdot \#_w(E') \cdot \delta_w(E),$$

where w is a word, $\theta_w$ is a constant, E is a candidate translation, E' is an automatic translation, $\#_w(E')$ is a number of times that w occurs in E', and $\delta_w(E)$ is 1 if w $\in$ E and 0 otherwise.

2. A computer-implemented method, comprising:
accessing, by one or more computing devices having one or more processors, a translation lattice, where the translation lattice represents a plurality of candidate translations generated by a single first machine translation system;
performing decoding, by the one or more computing devices, on the translation lattice utilizing a second machine translation system to obtain a translation hypothesis from the plurality of candidate translations that minimizes an expected error in classification in the translation lattice, the second machine translation system being different from the first machine translation system; and
providing, from the one or more computing devices, the obtained translation hypothesis for use by a user as a suggested translation in a target translation,
where performing decoding on the lattice comprises performing Minimum Bayes-Risk (MBR) decoding; and
where performing MBR decoding includes calculating:

$$\hat{E} = \underset{E' \in \Psi}{\mathrm{argmax}} \left\{ \theta_0 |E'| + \sum_{w \in N} \theta_w \cdot \#_w(E') \cdot P(w \mid \Psi) \right\},$$

where w is a word, $\theta_w$ is a constant, E' is an automatic translation, $\#w(E')$ is a number of times that w occurs in E', $\Psi$ represents the translation lattice, and $P(w|\Psi)$ is the posterior probability of w in the translation lattice.

3. The method of claim 2, where $$P(w \mid \Psi) = \sum_{E \in \Psi_w} P(E \mid F) = \frac{Z(\Psi_w)}{Z(\Psi)},$$

where $\Psi_w = \{E \in \Psi | \delta_w(E) > 0\}$ represents paths of the translation lattice containing w at least once, $Z(\Psi_w)$ represents a sum of weights of paths in $\Psi_w$, and $Z(\Psi)$ represents a sum of weights of paths in $\Psi$.

4. A computer program product, encoded on a non-transitory tangible program carrier, operable to cause data processing apparatus to perform operations comprising:
accessing a translation lattice, where the translation lattice represents a plurality of candidate translations generated by a single first machine translation system;
performing decoding on the translation lattice utilizing a second machine translation system to obtain a translation hypothesis from the plurality of candidate translations that minimizes an expected error in classification in the translation lattice, the second machine translation system being different from the first machine translation system; and
providing the obtained translation hypothesis for use by a user as a suggested translation in a target translation,
where performing decoding on the lattice comprises performing Minimum Bayes-Risk (MBR) decoding including calculating an approximation of a corpus BLEU gain, where the approximation of the corpus BLEU gain is represented as:

$$G(E, E') = \theta_0 |E'| + \sum_{w \in N} \theta_w \cdot \#_w(E') \cdot \delta_w(E),\quad 5$$

where w is a word, $\theta_w$ is a constant, E is a candidate translation, E' is an automatic translation, $\#_w(E')$ is a number of times that w occurs in E', and $\delta_w(E)$ is 1 if w ∈ E and 0 otherwise.

5. A computer program product, encoded on a non-transitory tangible program carrier, operable to cause data processing apparatus to perform operations comprising:

accessing a translation lattice, where the translation lattice represents a plurality of candidate translations generated by a single first machine translation system;

performing decoding on the translation lattice utilizing a second machine translation system to obtain a translation hypothesis from the plurality of candidate translations that minimizes an expected error in classification in the translation lattice, the second machine translation system being different from the first machine translation system; and providing the obtained translation hypothesis for use by a user as a suggested translation in a target translation, where performing decoding on the lattice comprises performing Minimum Bayes-Risk (MBR) decoding, and where performing MBR decoding includes calculating:

$$\hat{E} = \underset{E' \in \Psi}{\operatorname{argmax}} \left\{ \theta_0 |E'| + \sum_{w \in N} \theta_w \cdot \#_w(E') \cdot P(w|\Psi) \right\},$$

where w is a word, $\theta_w$ is a constant, E' is an automatic translation, $\#_w(E')$ is a number of times that w occurs in E', $\Psi$ represents the translation lattice, and $P(w|\Psi)$ is the posterior probability of w in the translation lattice.

6. The method of claim 5, where $$P(w|\Psi) = \sum_{E \in \Psi_w} P(E|F) = \frac{Z(\Psi_w)}{Z(\Psi)},$$

where $\Psi_w = \{E \in \Psi | \delta_w(E) > 0\}$ represents paths of the translation lattice containing w at least once, $Z(\Psi_w)$ represents a sum of weights of paths in $\Psi_w$, and $Z(\Psi)$ represents a sum of weights of paths in $\Psi$.

* * * * *